(12) United States Patent
Grisa et al.

(10) Patent No.: US 10,437,587 B2
(45) Date of Patent: Oct. 8, 2019

(54) SOFTWARE PACKAGE ANALYZER FOR INCREASING PARALLELIZATION OF CODE EDITING

(71) Applicant: SAP SE, Walldorf (DE)

(72) Inventors: Michel Grisa, São Leopoldo (BR); Rafael Damaceno, São Leopoldo (BR); Marcelo Zambiasi, Canoas (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/943,728

(22) Filed: Nov. 17, 2015

(65) Prior Publication Data
US 2017/0139705 A1   May 18, 2017

(51) Int. Cl.
*G06F 8/72*   (2018.01)
*G06F 8/71*   (2018.01)

(52) U.S. Cl.
CPC . *G06F 8/72* (2013.01); *G06F 8/71* (2013.01)

(58) Field of Classification Search
CPC .................................... G06F 8/72; G06F 8/71
USPC ...................................................... 717/110
See application file for complete search history.

(56) References Cited

U.S. PATENT DOCUMENTS

| | | | | |
|---|---|---|---|---|
| 2008/0037854 | A1* | 2/2008 | Grossman | G06F 8/70 382/135 |
| 2010/0077380 | A1* | 3/2010 | Baker | G06F 8/71 717/120 |
| 2010/0162225 | A1* | 6/2010 | Huang | G06F 8/72 717/171 |
| 2011/0035726 | A1* | 2/2011 | Davies | G06F 8/71 717/110 |
| 2012/0174082 | A1* | 7/2012 | Dolby | G06F 8/72 717/151 |
| 2013/0111441 | A1* | 5/2013 | Clemm | G06F 8/72 717/121 |

(Continued)

OTHER PUBLICATIONS

Giunta et al, "AODP: Refactoring Code to Provide Advanced Aspect-Oriented Modularization of Design Patterns", [Online], 2011, pp. 1243-1250, [Retrieved from internet on May 16, 2019], <http://delivery.acm.org/10.1145/2240000/2231971/p1243-giunta.pdf?ip=151.207.250.22&id=2231971&acc=ACTIVE%20SERVICE&k> (Year: 2011).*

(Continued)

*Primary Examiner* — Ziaul A Chowdhury
*Assistant Examiner* — Zengpu Wei
(74) *Attorney, Agent, or Firm* — Mintz Levin Cohn Ferris Glovsky and Popeo, P.C.

(57) ABSTRACT

An identification of a software package stored in a code library and accessible for editing by at least a first developer and a second developer may be received. The software package may include a plurality of objects, and a first grant of editing access to the first developer for an object prohibits a second grant of editing access to the second developer for the object, while the first grant is valid. The object may be divided into a first object block and a second object block, characterized by first block development data and second block development data obtained from development data for the plurality of objects. Then, the first object block and the second object block may be identified for independent grants of editing access to the first developer and the second developer, based on the first block development data and the second block development data.

20 Claims, 13 Drawing Sheets

(56) References Cited

U.S. PATENT DOCUMENTS

| | | | | |
|---|---|---|---|---|
| 2013/0152047 | A1* | 6/2013 | Moorthi | G06F 11/368 |
| | | | | 717/124 |
| 2013/0332212 | A1* | 12/2013 | Cohen | G06Q 10/06 |
| | | | | 705/7.15 |
| 2014/0053125 | A1* | 2/2014 | DeLuca | G06Q 10/06398 |
| | | | | 717/101 |
| 2014/0289700 | A1* | 9/2014 | Srinivasaraghavan ... | G06F 8/34 |
| | | | | 717/106 |
| 2014/0304215 | A1* | 10/2014 | Masinter | G06F 17/3023 |
| | | | | 707/602 |
| 2014/0380280 | A1* | 12/2014 | Millwood | G06F 11/366 |
| | | | | 717/127 |
| 2015/0348294 | A1* | 12/2015 | Sridharan | G06F 8/34 |
| | | | | 345/440 |
| 2016/0034273 | A1* | 2/2016 | Leupold | G06F 8/71 |
| | | | | 717/122 |

OTHER PUBLICATIONS

Herbold et al, "Automated Refactoring Suggestions Using the Results of Code Analysis Tools", [Online], 2009, pp. 104-109, [Retrieved from internet on May 16, 2019], <https://ieeexplore.ieee.org/stamp/stamp.jsp?tp=&arnumber=5279916> (Year: 2009).*

Tichelaar et al, "A Meta-model for Language-Independent Refactoring", [Online], 2000, pp. 1-11, [Retrieved from internet on May 16, 2019], <http://citeseerx.ist.psu.edu/viewdoc/download?doi=10.1.1.32.3023&rep=rep1&type=pdf> (Year: 2000).*

* cited by examiner

200

---

Receive an identification of a software package stored in a code library and accessible for editing by at least a first developer and a second developer, wherein the software package includes a plurality of objects and wherein a first grant of editing access to the first developer for an object prohibits a second grant of editing access to the second developer for the object, while the first grant is valid
202

Access development data for the plurality of objects, including the object
204

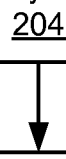

Divide the object into a first object block and a second object block characterized by first block development data and second block development data respectively obtained from the development data
206

Identify the first object block and the second object block for independent grants of editing access to the first develop and the second developer, based on the first block development data and the second block development data
208

FIG. 2

| Object Name | Obj. Type | No. of ver | Ini. size | No. lines | % Growth | Conc/disp | Heat Map |
|---|---|---|---|---|---|---|---|
| LJ1BGF02 | REPS | 44 | 3,364 | 4,024 | 19.62 | Concentrated | Heat Map |
| LJ1BGF01 | REPS | 40 | 4,853 | 5,325 | 9.73 | Concentrated | Heat Map |
| LJ1BGF01 | REPS | 40 | 4,078 | 4,627 | 13.46 | Concentrated | Heat Map |
| J_1BCALCULATE_TAXES | FUNC | 29 | 5,691 | 6,373 | 11.98 | Concentrated | Heat Map |
| LJ1BGF01 | REPS | 29 | 3,080 | 3,441 | 11.72 | Concentrated | Heat Map |
| LJ1BB2TOP | REPS | 27 | 450 | 1,077 | 73.43 | Concentrated | Heat Map |
| LJ_1B_NFEF72 | REPS | 27 | 287 | 607 | 34.89 | Concentrated | Heat Map |
| LJ_1B_NFEF79 | REPS | 24 | 915 | 423 | 47.39 | Concentrated | Heat Map |
| LJ1BITOP | REPS | 23 | 397 | 1,115 | 21.86 | Concentrated | Heat Map |
| LJ_1B_NFE_INF3C | REPS | 21 | 270 | 660 | 66.25 | Dispersed | Heat Map |
| LJ1BRF02 | REPS | 21 | 2,994 | 445 | 64.81 | Concentrated | Heat Map |
| LJ_1B_NFE_INF3B | REPS | 20 | 357 | 3,416 | 14.09 | Concentrated | Heat Map |
| LJ_1B_NF_VALUE_DETERMINATION | REPS | 20 | 341 | 525 | 47.06 | Concentrated | Heat Map |
| J_BNFECALLRFC | FUNC | 20 | 967 | 436 | 27.86 | Concentrated | Heat Map |
| LJ_1B_NFEF73 | REPS | 19 | 182 | 1,257 | 29.99 | Concentrated | Heat Map |
| LJ1BB20I02 | REPS | 18 | 180 | 321 | 76.37 | Concentrated | Heat Map |
| J_1BBR20 | REPS | 18 | 3,128 | 284 | 57.78 | Concentrated | Heat Map |
| LJ1BNTF1 | REPS | 17 | 1,135 | 3,234 | 3.39 | Concentrated | Heat Map |
| J_1B_NFE_SET_NUMBER | REPS | 16 | 757 | 1,413 | 24.49 | Concentrated | Heat Map |
| BAPI_J_1B_NF_CREATEFROMDATA | FUNC | 16 | 424 | 1,007 | 33.03 | Concentrated | Heat Map |
| J_1B_NF_VALUE_DETERMINATION_1 | FUNC | 16 | 440 | 645 | 52.12 | Concentrated | Heat Map |
| LJ_1BGTOP | FUNC | 16 | 463 | 642 | 45.91 | Concentrated | Heat Map |
| J_1BNFE_INVOICE_CREATE | REPS | 16 | 517 | 625 | 34.99 | Concentrated | Heat Map |
| CL_TAX_CALC_BR | FUNC | 16 | 449 | 609 | 17.79 | Dispersed | Heat Map |
| LJ_1B_NFEF80 | CPRO | 16 | 211 | 596 | 32.74 | Concentrated | Heat Map |
| J_1B_NF_MAP_TO_XML | REPS | 16 | 303 | 407 | 92.89 | Dispersed | Heat Map |
| LJ_1B_NFE_INTOP | FUNC | 16 | 246 | 401 | 32.34 | Concentrated | Heat Map |
| LJ_1B_NFE_INF3J | REPS | 16 | 134 | 397 | 61.38 | Concentrated | Heat Map |
| J_1BNF_MERGE_BADI_FIELDS | REPS | 15 | 101 | 303 | 126.12 | Concentrated | Heat Map |
| RFFORIY1 | FUNC | 15 | 3,702 | 190 | 88.12 | Concentrated | Heat Map |
| LJ1BB21A2 | REPS | 15 | 452 | 3,786 | 2.27 | Concentrated | Heat Map |
| LJ1BIF27 | REPS | 15 | 172 | 637 | 40.93 | Dispersed | Heat Map |

FIG. 3

| Block No. | Number of | % | No single hits | No single | No lines cha. | No.enhan | Initial line | Last line |
|---|---|---|---|---|---|---|---|---|
| 1 | 4 | 4,60 | 1 | 1,15 | 63 | 0 | 1 | 200 |
| 2 | 10 | 11,49 | 3 | 3,45 | 71 | 0 | 201 | 400 |
| 3 | 7 | 8,05 | 0 | 0,00 | 80 | 2 | 401 | 600 |
| 4 | 3 | 3,45 | 0 | 0,00 | 21 | 1 | 601 | 800 |
| 5 | 4 | 4,60 | 3 | 3,45 | 21 | 0 | 801 | 1.000 |
| 6 | 9 | 10,34 | 3 | 3,45 | 48 | 0 | 1.001 | 1.200 |
| 7 | 8 | 9,20 | 0 | 0,00 | 47 | 0 | 1.201 | 1.400 |
| 8 | 5 | 5,75 | 2 | 2,30 | 170 | 0 | 1.401 | 1.600 |
| 9 | 3 | 3,45 | 0 | 0,00 | 14 | 0 | 1.601 | 1.800 |
| 10 | 0 | 0,00 | 0 | 0,00 | 0 | 0 | 1.801 | 2.000 |
| 11 | 2 | 2,30 | 0 | 0,00 | 13 | 0 | 2.001 | 2.200 |
| 12 | 4 | 4,60 | 0 | 0,00 | 46 | 0 | 2.201 | 2.400 |
| 13 | 4 | 4,60 | 0 | 0,00 | 40 | 0 | 2.401 | 2.600 |
| 14 | 4 | 4,60 | 1 | 1,15 | 39 | 0 | 2.601 | 2.800 |
| 15 | 4 | 4,60 | 0 | 0,00 | 71 | 0 | 2.801 | 3.000 |
| 16 | 4 | 4,60 | 2 | 2,30 | 34 | 0 | 3.001 | 3.200 |
| 17 | 3 | 3,45 | 0 | 0,00 | 45 | 0 | 3.201 | 3.400 |
| 18 | 4 | 4,60 | 2 | 2,30 | 46 | 0 | 3.401 | 3.600 |
| 19 | 3 | 3,45 | 0 | 0,00 | 44 | 0 | 3.601 | 3.800 |
| 20 | 2 | 2,30 | 0 | 0,00 | 87 | 0 | 3.801 | 4.000 |
| 21 | 0 | 0,00 | 0 | 0,00 | 0 | 0 | 4.001 | 4.024 |

SOFTWARE PACKAGE ANALYZER FOR INCREASING PARALLELIZATION OF CODE EDITING

TECHNICAL FIELD

This description relates to development of software code.

BACKGROUND

Modern software applications often include extremely large quantities of code. In order to develop such applications in a timely, efficient manner, it may be helpful or necessary to utilize a plurality of software developers to compose, correct, maintain, and/or update the code. Such software developers are each tasked with editing assigned or selected portions of the code, in order to perform required or desired edits. In order to increase a speed, efficiency, and volume of software edits, and thereby increase a quality and availability of the software application, techniques have been developed that enable two or more developers to work on different portions of the same code at the same time, e.g., in parallel.

Consequently, it may occur that two or more developers may desire to access and edit an overlapping or identical portion of the code during an overlapping time frame. In such scenarios, it is typically necessary to permit a first developer to proceed with code edits, while temporarily blocking a second developer from doing so, until the first developer is finished.

This approach ensures code consistency, and prevents redundant and/or contradictory changes. In practice, however, this approach may impart considerable delay and inconvenience to the software developers, and to the software development as a whole, since, for example, developers may have to wait for unacceptable periods of time to perform edits.

SUMMARY

Described techniques provide for the refactoring of software objects within software code, so as to provide more granular and more practical divisions of software code being developed in parallel by a plurality of developers. In particular, the described techniques utilize historical development data characterizing previous development efforts on the code, to thereby analyze code portions and determine which of the code portions would benefit from refactoring into smaller editable units. In this way, the software code may be edited with a higher degree of parallelization, with fewer developers experiencing any lengthy delays before being able to proceed with desired edits. As a result, the software application as a whole may be maintained more easily and more efficiently.

According to one general aspect, a computer program product may be tangibly embodied on a non-transitory computer-readable storage medium and may include instructions that, when executed, may be configured to cause at least one computing device to receive an identification of a software package stored in a code library and accessible for editing by at least a first developer and a second developer, wherein the software package includes a plurality of objects and wherein a first grant of editing access to the first developer for an object prohibits a second grant of editing access to the second developer for the object, while the first grant is valid. The instructions, when executed, may be further configured to access development data for the plurality of objects, including the object, and divide the object into a first object block and a second object block, characterized by first block development data and second block development data obtained from the development data. Then, the instructions, when executed, may be further configured to identify the first object block and the second object block for independent grants of editing access to the first developer and the second developer, based on the first block development data and the second block development data.

According to another general aspect, a computer-implemented method for executing instructions may be stored on a non-transitory computer readable storage medium. The method may include receiving an identification of a software package stored in a code library and accessible for editing by at least a first developer and a second developer, wherein the software package includes a plurality of objects and wherein a first grant of editing access to the first developer for an object prohibits a second grant of editing access to the second developer for the object, while the first grant is valid. The method also may include accessing object-level development data for the plurality of objects, including the object, the object-level development data characterizing a development history and current status of each object of the plurality of objects, and selecting the object, based on the object-level development data. The method also may include dividing the object into a first object block and a second object block, characterized by first block development data and second block development data obtained from the development data, and identifying the first object block and the second object block for independent grants of editing access to the first developer and the second developer, based on the first block development data and the second block development data.

According to another general aspect, a system may include instructions recorded on a non-transitory computer-readable storage medium, and executable by at least one processor. The system may include a package handler configured to receive an identification of a software package stored in a code library and accessible for editing by at least a first developer and a second developer, wherein the software package includes a plurality of objects and wherein a first grant of editing access to the first developer for an object prohibits a second grant of editing access to the second developer for the object, while the first grant is valid. The system also may include a development data handler configured to identify object level development data for the plurality of objects, including the object, the object-level development data characterizing a development history and current status of each object of the plurality of objects, the development data handler being further configured to access the identified object-level development data from at least one development data repository. The system also may include an object ranking generator configured to rank the plurality of objects, including the object, based on the object-level development data, the ranking characterizing a relative potential benefit obtained from granting independent editable access to at least two object blocks of each object, including the object. The system also may include a heat map generator configured to divide the object into a plurality of object blocks, each object block characterized by corresponding block-level development data obtained from the at least one development data repository, and further configured to indicate at least one object block of the plurality of object blocks to be refactored for independent grant of editing access to the first developer and the second developer.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart illustrating example implementations of the system of FIG. 1.

FIG. 3 is a screenshot of an example implementation of a package analyzer user interface of FIG. 1.

DETAILED DESCRIPTION

Figure 1:
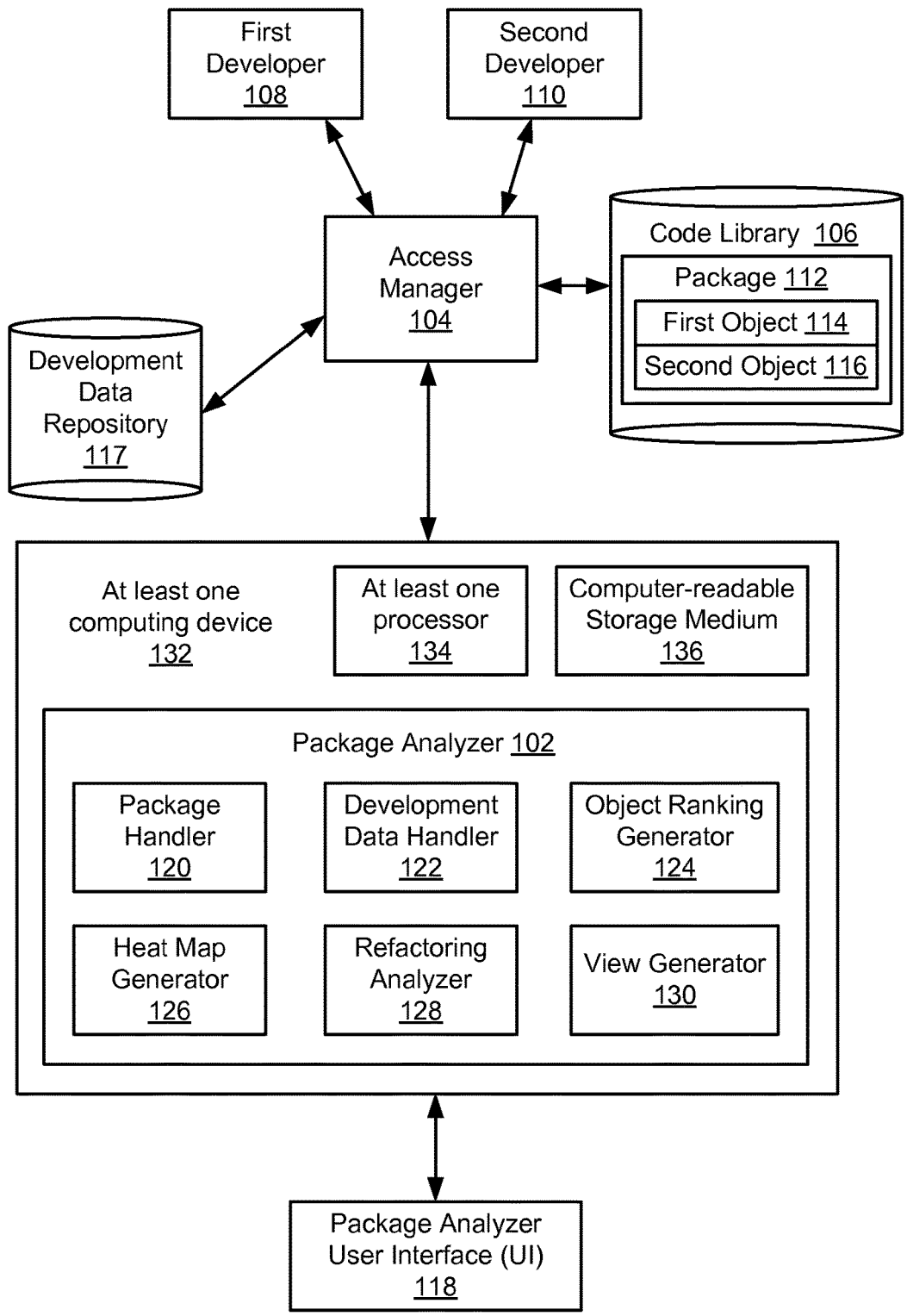
FIG. 1 is a block diagram of a system 100 for software package analysis for increasing parallelization of code editing.

FIG. 1 is a block diagram of a system 100 for software package analysis for increasing parallelization of code editing. In the system 100, a package analyzer 102 is configured to facilitate operations of an access manager 104 in granting editing access to code within a code library 106 to a plurality of software developers represented by a first developer 108 and a second developer 110. The package analyzer 102 may be configured to analyze specified code within the code library 106, and refactor the code so as to provide more granular divisions of the code with respect to the granting of editing access by the access manager 104 to the developers 108, 110. In this way, developers such as the developers 108, 110 experience a minimum of wait time and associated inconvenience when desiring to edit a desired portion(s) of code.

More particularly, as referenced above and described in detail herein, the access manager 104 may be designed to provide the developers 108, 110 with independent grants of editing access for editing code within a software package 112, such that the first developer 108 is granted editing access to a first object 114, while the second developer 110 is blocked from being granted editing access to the first object 114. Meanwhile, the second developer 110 may be granted editing access to a second object 116, while the first developer 108 is blocked from being granted editing access to the second object 116. In such scenarios, if it occurs that the first developer 108 requires editing access to a specified portion of the second object 116, then the first developer 108 must wait until the entire second object 116 is released from the grant of editing access to the second developer 110, even if the desired portion of the second object 116 is not currently being edited by the second developer 110.

Therefore, the package analyzer 102 is configured to analyze objects of the software package 112, including the objects 114, 116, using historical development data characterizing a manner in which the objects 114, 116 were previously developed (e.g., edited), where the development data is illustrated in FIG. 1 as being stored in a development data repository 117. Based on this development data, the package analyzer 102 may divide (refactor) each object 114, 116 into smaller editable portions, where the smaller portions are defined based on code portions having histories of relatively more (or less) frequent access events, or based on other factors, as described below.

In other words, for example, code (object) portions which are interpreted as having more errors, or other reasons for relatively frequent editing, are identified for separation from an object(s) as a whole, so that remaining portions of the object(s) remain free for granting of editing access by the access manager 104. For example, in the simplified scenarios above, it may occur that the first developer 108 is provided with an ability to edit a desired portion of the second object 116, even while the second developer 110 continues to work on an object portion of the second object 116 having a historically greater association with errors or other reasons for editing (as determined from the historical development data). Consequently, the first developer 108 may experience less waiting and inconvenience when editing the package 112, while the overall software development efforts are protected from redundant, overlapping, and/or inconsistent editing efforts.

In the example of FIG. 1, the package analyzer 102 is illustrated as being implemented separately from the access manager 104. In various implementations, the package analyzer 102 and the access manager 104 may be implemented together or separately, and in the context of a larger software development environment (the details of which are omitted from the example of FIG. 1, in the interest of clarity and conciseness).

Nonetheless, it may be appreciated that such a software development environment may be implemented on a large scale, such as when large software applications, or a large number of applications, are being developed by a correspondingly large number of software developers. Moreover, such software developers may be geographically dispersed from one another, such as when the software is developed in the context of an enterprise having a number of dispersed corporate locations.

In these and similar circumstances, the first developer 108 and the second developer 110 may conceptually represent a large number of such potentially dispersed software developers, each of whom accesses the access manager 104 using an appropriate computer network, including a wide area network such as the internet, or a corporate-wide virtual private network (VPN).

In practice, as referenced above, it may occur that such software developers wish to access the same or different portions of the code library 106, according to their own individual or group project schedules. Moreover, in various implementations, it may occur that a given software developer wishes to access a particular code portion for a relatively brief amount of time, or may wish to access a specific code portion for a relatively extended period. Due to the potentially large scale of geographically dispersed software development referenced above, it will thus be appreciated that it is difficult or impossible for the various developers to coordinate with one another with respect to respective code access. Although the access manager 104 may be configured to enforce code consistency by blocking developer access to code objects or other portions currently being accessed for development, such an approach often results in inconveniences to developers attempting to access a desired code object, as well as potentially causing delays in the timing of the code development process.

In order to address these and similar situations, and to provide the various advantages described herein, the package analyzer 102 is configured to utilize development data from within the development data repository 117 (sometimes referred to herein simply as the development data 117) to dynamically refactor code within the code library 106. More specifically, the package analyzer 102 may utilize the development data 117 to determine that a particular portion of the first object 114 has been frequently and/or recently edited, and may thereafter refactor the first object 114 into two separate object blocks, where the object block containing the frequently/edited code is registered with the access manager 104 as being separately editable from the remainder object block of the original first object 114. In this way, for example, the first developer 108 may proceed to edit the first object block of the first object 114, without restricting access of the second developer 110 to a remainder of the first object 114, as included within the newly-refactored object block thereof.

Of course, the package analyzer 102 is configured to refactor objects of the package 112 into virtually any practical number of individual object blocks of varying sizes. In fact, through analysis and use of the development data 117, the package analyzer 102 may be configured to determine preferable or optimal sizes of object blocks for refactoring the various objects of the package 112. Moreover, over time, the package analyzer 102 may be configured to dynamically adjust and refactor the various objects of the package 112, depending on intervening changes to the development data 117.

For example, in the example just given, it may occur that the refactored first object block of the first object 114, over time, is determined not to be as heavily or recently edited, so as to no longer require a refactoring from the first object 114 and other object blocks thereof. Accordingly, the package analyzer 102 may refactor the original first object 114 into new, different object blocks for subsequent independent access thereto by the developers 108, 110.

For example, a particular object block of the first object 114 may be frequently or recently edited due to the need to correct or update a feature associated therewith. During a timeframe of associated edits to the refactored object block, the package analyzer 102 enables independent editing access thereto, without restricting access to other portions of the first object 114. However, once the refactored object block reflects a completion of the correction/update, the package analyzer 102 may determine that it is no longer necessary or helpful to maintain the refactored object block separately from the first object 114. Thus the package analyzer 102 may execute refactoring on a dynamic, ongoing basis that reflects a current or updated status of the development data 117.

In order for a user to configure and otherwise interact with the package analyzer 102, a package analyzer user interface (UI) may be provided in conjunction with the package analyzer 102. Accordingly, an administrator or other user of the system 100 may be provided with an ability to configure operations of the package analyzer 102.

For example, the package analyzer 102 may be configured with respect to the type of development data maintained within the development data repository 117, as well as a manner in which some or all of the development data 117 is used with respect to the package 112. Of course the package analyzer UI 118 also may be used to provide results of operations of the package analyzer 102, so that a user of the system 100 may judge or utilize the results accordingly. Of course, the package analyzer UI 118 also may provide immediate results of operations of the package analyzer 102, as well as various other user interaction features, some of which are described in detail below, or would be apparent.

In more detail, the package analyzer 102 is illustrated as including a package handler 120. For example, the package handler 120 may be configured to receive a user (or automatic) selection of one or more packages within the code library 106, such as the package 112. For example, a user of the package analyzer UI 118 may identify a package or group of packages within the code library 106, or the package handler 120 may identify candidate packages for object refactoring, perhaps based on the development data 117.

Perhaps dependent upon the type or identity of the package chosen, a development data handler 122 may proceed to retrieve appropriate, corresponding development data. Of course, in the simplified example of FIG. 1, the development data handler 122 may interface with the development data repository 117 in order to obtain related data. In other example implementations, the development data 117 may be stored using the code library 106, and/or may be stored in conjunction with corresponding packages, objects, or object portions to which the relevant portions of the development data 117 relate.

Although not explicitly or separately illustrated in the example of FIG. 1, it will be appreciated that the development data handler 122 may include, or access, development data access criteria specifying specific development data or types of development data to be accessed with respect to particular packages, objects, or types of packages/objects. For example, the development data handler 122 may be configured to access certain types of development data for a first software application or type of software application (and associated code), but may be configured to access other types of development data for a second software application (or type of software application).

Once the package and associated development data have been identified, an object ranking generator 124 may be configured to analyze the package using the obtained development data. The object ranking generator 124 may thus generate a ranked list of objects within the selected package that have been determined, based on the development data, to be the best or most likely candidates for potential refactoring.

In some example implementations, only those objects ranked above a predetermined threshold may be considered for refactoring, so as to conserve resources of the package analyzer 102, and ensure timely completion of the refactoring operations thereof. Also, it is not necessary for the object ranking generator 124 to rank all included objects, or to rank all included objects individually. For example, objects below a certain size may be omitted from the ranking, and/or included objects may be ranked in object groups.

As described in detail below, in various example implementations, the object ranking generator 124 may execute the object ranking based on development data that includes, e.g., a number of times each object has been requested, a number of lines included within each object (i.e., a size of the object), or a percentage of growth of the object over time. Of course, these and other ranking factors may be parameterized as desired. For example, the number of requests, and the percent of growth, may be determined only with respect to a recent, identified time window, or may be identified with respect to a time of creation of the object or package in question. Additional or alternative examples of ranking factors, and their use thereof, are provided in detail below, or would be apparent. An example output of the object ranking generator 124 is provided below, with respect to FIG. 3.

While the object ranking generator 124 considers some or all of the objects within an identified package, a heat map generator 126 may be configured to analyze individual objects of the objects ranked by the object ranking generator 124. For example, each object may be split into a number of object blocks, each having a designated number of lines of code included therein, and the heat map generator 126 may then apply similar or different types of development data analysis with respect to each individual object block, rather than with respect to the object as a whole. An example output of the heat map generator 126 is provided below, with respect to FIG. 4.

A refactoring analyzer 128 may be configured to utilize the resulting ranked objects and heat maps associated therewith, in order to assist in refactoring individual objects into two or more separately editable object blocks. For example, the refactoring analyzer 128 may simply present identified objects or object blocks considered to be most likely or most useful in a refactoring process. That is, the refactoring analyzer 128 may utilize the view generator 130 to display a first object block and a second object block for independent grants of editing access, and receive a selection of the first object block and the second object block for the independent grants of editing access by way of the package analyzer UI 118.

In other implementations, the refactoring analyzer 128 may automatically execute refactoring of the identified objects or object blocks. In some implementations, the refactoring analyzer 128 also may configure or parameterize the resulting refactoring in a desired manner. For example, the refactoring analyzer 128 may set an expiration time, at which point the refactored object might automatically revert to its original form. Similarly, the refactoring analyzer 128 may designate a future time for subsequent package analysis, in order to verify a continuing usefulness of the refactored object, or, alternatively, to undo the refactoring, or create a new refactoring.

Finally with respect to the package analyzer 102, a view generator 130 is illustrated and may be configured to provide the package analyzer UI 118. For example, the view generator 130 may provide any appropriate screens and associated data and input fields, such as those illustrated below with respect to FIGS. 3 and 4. Of course, the view generator 130 also may be configured to provide otherwise conventional operations associated with receiving input from a user at the package analyzer UI 118, as well as other functionalities related to operations of graphical user interfaces.

In the example of FIG. 1, the package analyzer 102 is illustrated as being executed using at least one computing device 132, which itself is illustrated as including at least one processor 134 and non-transitory computer readable storage medium 136. For example, although the package analyzer 102 is illustrated in the example of FIG. 1 as a single, discrete entity, it may be appreciated that, in some implementations, two or more aspects or functionalities of the package analyzer 102 may be implemented using two or more computing devices in communication with one another.

For example, although the package analyzer 102 is illustrated as including the separate modules 120-130, it will be appreciated that various ones of the components 120-130 may be executed on two or more computing devices in communication with one another, as just referenced. Further, any of the individual components 120-130 may be executed using two or more subcomponents thereof, on the same or different computer. Conversely, in some example implementations, two or more of the components 120-130 may be executed as subcomponents of a single component.

Somewhat similarly, two or more processors represented by the at least one processor 134 may be utilized to execute functions of the package analyzer 102 in a parallel or overlapping manner. Meanwhile, the non-transitory computer readable storage medium 136 generally represents any suitable memory for storing instructions to be executed by the at least one processor 134 to provide the package analyzer 102 and associated functionalities thereof.

As also referenced above, it will be appreciated that the access manager 104 may be executed using the same computer hardware 132-136 illustrated in FIG. 1 as providing a platform for the package analyzer 102. As also referenced above, the system 100 may be implemented in a client-server context, so that, for example, the package analyzer 102 and/or the access manager 104, or portions thereof, may be executed at a remote server, and/or at a client machine that is local to a user of the package analyzer UI 118 and/or the developers 108, 110.

FIG. 2 is a flowchart 200 illustrating example operations of the system 100 of FIG. 1. In the example of FIG. 2, operations 202-208 are illustrated as separate, sequential operations. However, in various example implementations, two or more of the operations 202-208 may be implemented in a partially or completely parallel or overlapping manner, or in a nested, iterative, branched, or looped fashion. In the various implementations, additional or alternative operations or sub-operations may be included, while, in some example implementations, one or more of the operations 202-208, or sub-operations thereof, may be omitted.

In the example of FIG. 2, an identification of a software package stored in a code library and accessible for editing by at least a first developer and a second developer may be received, wherein the software package includes a plurality of objects and where a first grant of editing access to the first developer for an object prohibits a second grant of editing access to the second developer for the object, while the first grant is valid (202). For example, with respect to FIG. 1, the package handler 120 may receive an identification of the package 112 within the code library 106, where, as described, the package 112 is accessible for editing by the developers 108, 110, through the use of the access manager 104. As also described, the access manager 104 is configured to provide grants of editing access to individual ones of the developers 108, 110, with respect to the first object 114 and the second object 116 of the package 112, while denying access to any currently-accessed object, in the event of a request from one or more different developers.

With respect to terminology, it will be appreciated that the term software package, or package, refers generally to any collection of objects that may be grouped or stored together by virtue of, e.g., similar or related functionalities or purposes. Similarly, the term object should be generally understood to represent or include potentially any type of software code that may be stored discretely and grouped or included within the package 112, as described herein. Thus, for example, some programming languages and associated development context may explicitly use the terms object and package, or similar terms, such as software applications developed using the ABAP language and associated software development context used, e.g., by SAP SE of Waldorf, Germany. However, as just described, it will be appreciated that implementations of FIGS. 1 and 2 may be constructed using any appropriate software language and associated development context.

As also referenced above, the identification of the package 112 may be received by the package handler 120 by way of the package analyzer UI 118, e.g., may be received from a user of the system 100. In additional or alternative example implementations, the package 112 may be identified automatically by the package handler 120, e.g., in response to a request for such an identification from a user of the system 100, and using the development data 117.

Further in FIG. 2, development data for the plurality of objects, including the object, may be accessed (204). For example, the development data handler 122 may access, for the identified package 112, associated development data from the development data repository 117. In some implementations, the development data handler 122 may be configured to assist in the collection and compilation of the development data 117. Additionally, or alternatively, and depending on a type of development data being collected, the access manager 104 may be configured to assist in the population of the development data repository 117. With respect to populating and accessing the development data repository 117, it will be appreciated that the development data may be obtained, accessed, and stored, using two or more storage locations, although the development repository 117 is illustrated singularly in the simplified example of FIG. 1.

For example, development data relating to a number of times that the package 112 has been accessed for editing may be obtained from activity logs of the access manager 104. In other examples, for other types of development data, the development data may be obtained from metadata associated and stored with the package 112 itself, such as an original time of creation of the software package 112. In yet other examples, the development data may be obtained based on an analysis of the package 112 itself. Thus, the development data handler 122 should be understood to potentially be configured to obtain development data from a variety of sources, and using a variety of techniques.

The object may then be divided into a first object block and a second object block characterized by first block development data and second block development data, respectively, obtained from the development data (206). For example, the heat map generator 126 may be configured to divide the first object 114 into two or more object blocks, as illustrated and described below, with respect to FIG. 4.

The first object block and the second object block may be identified for independent grants of editing access to the first developer and the second developer, based on the first block development data and the second block development data (208). For example, the refactoring analyzer 128 may be configured to analyze block specific development data, and thereby identify individual object blocks for which independent editable access would be beneficial or optimal with respect to the developers 108, 110, and within the software development environment as a whole.

Thus, FIG. 2 illustrates certain example implementations of the system 100 of FIG. 1, where, as described, additional or alternative operations or sub-operations also may be included. For example, as described above with respect to the object ranking generator 124, it may be desirable to rank individual objects of the package 112, before initiating operations of the heat map generator 126 and the refactoring analyzer 128. For example, the object ranking generator 124 may determine that the first object 114 is more likely to contain object blocks that might beneficially be granted independent editable access than the second object 116. Consequently, the heat map generator 126 may analyze the first object 114 instead of, or at least before, analyzing the second object 116. Additional and more detailed example implementations of the system 100 of FIG. 1 and the flowchart 200 of FIG. 2 are provided below, or would be apparent.

FIG. 3 is a screenshot 300 of an example implementation of the package analyzer user interface 118 of FIG. 1, utilized to display an output of the object ranking generator 124. That is, as shown, FIG. 3 illustrates object-level development data characterizing a development history and current status of each object of a plurality of (ranked) objects. Further, FIG. 3 illustrates a ranking of the objects based on the object-level development data, the ranking characterizing a relative potential benefit obtained from refactoring each object of the plurality of objects (e.g., a relative potential benefit obtained from granting independent editable access to at least two object blocks of each object).

As shown, the screenshot 300 provides a list of ranked objects within a column 302, in which each ranked object is individually named. Meanwhile, in a column 304, an object type for each object is included. In the example of FIG. 3, and in the examples that follow, the primary examples of object types include report objects, function group/module objects, and class objects. Of course, many other object types may be included, as would be appropriate.

In a column 306, a number of versions determined for each ranked object is listed. In column 308, an initial size of each object is provided, while a current number of lines is included in 310, so that a percentage growth of each ranked object may be displayed in a column 312.

In a column 314, each object is classified as either concentrated or dispersed. That is, as referenced herein, concentration in this context refers to an extent to which changes made within the lines of an object's code are grouped or limited, relative to other groups of code within the same object. For example, in a highly simplified example, an object having 100 lines of code may have a history of having only the first 10 lines thereof be modified, while another 100 line object may have modifications made equally throughout its 100 lines code. Of course, in many example implementations, it may be less straightforward to determine how to characterize an extent of concentration of code changes, within each object, as well as among two or more different objects (i.e., relative extents of concentration among groups of objects). Thus, in some implementations, various types of heuristics may be utilized to verify or otherwise characterize a given object as concentrated or dispersed. For example, the chi-square algorithm, or the Pareto principal algorithm, or other suitable algorithms, may be used. Finally in the example of FIG. 3, a column 316 provides a link labeled "heat map," where the illustrated link provides an option for a user to view a heat map for the corresponding object within the same selected row, an example of which is illustrated and described below with respect to FIG. 4.

Of course, FIG. 3 is a merely a non-limiting example, and other example implementations may utilize additional or alternative columns for ranking various objects, or may use the same columns, but with different parameterizations thereof. For example, the column 306 listing a number of versions of a given object may be parameterized to count a number of requests for the object in question since the time of an identified date. In other example implementations, the number of versions may be measured differently, and/or may be measured from a date of creation of the object in question, or some other defined time frame. Similarly, the column 308 describing an initial size of the object may be parameterized with respect to an identified date against which a current size is compared, and/or may be compared against a size of the object at time of creation thereof.

Of course, as already referenced, the column 314 characterizing a relative level of concentration of a corresponding object may be calculated or parameterized in different ways, as well, as part of conveying whether there are specific, identified portions of the object code in which relatively higher numbers of changes are included, or whether there is no part of the corresponding object code having a high concentration of changes. Further, it will be appreciated that a nature in parameterization of the various heat maps represented by the heat map links of the column 316 will generally permit the user to select a particular heat map link and obtain details of any object modifications on a block-by-block basis within the object, thus demonstrating relative levels of modification of such object blocks within the object.

As may be appreciated from the above description of the object ranking generator 124 and the screenshot 300, the various objects of the column 302 are ranked in accordance with a corresponding degree to which each object has been determined to potentially benefit from object refactoring. For example, it may be observed that objects ranked near the top of the column 302 are associated with values in the columns 306-314 that are associated with increased chances of beneficial object refactoring.

For example, objects near the top of the column 302 may be observed to have relatively higher numbers of versions, as compared to objects near the bottom of the column 302. Similarly, higher values, or higher relative values, included within one or more of the columns 306-310, are generally found closer to the top column while lower values, or lower relative values, tend to be located lower within the columns. Although, in the example of FIG. 3, values for the column 314 are binary values of "concentrated" or "dispersed," it may be observed that the majority of the ranked objects are labeled concentrated. In additional or alternative implementations, concentration may be characterized using a scale of relative degree, rather than binary values.

Figure 4:
FIG. 4 is a screenshot illustrating an example heat map generated by a heat map generator of FIG. 1.

As already referenced, FIG. 4 is a screenshot 400 illustrating an example heat map generated by the heat map generator 126 and corresponding to one of the heat map links of the column 316 of FIG. 3. In the example of FIG. 4, as shown, a corresponding, selected object is divided into a plurality of object blocks. That is, for example, a given object listed and ranked within the column 302 of FIG. 3 corresponds generally to the first object 114 of FIG. 1, so that the heat map of the screenshot 400 displays a plurality of object blocks into which the selected object is divided or split. Further, the various columns of FIG. 4 provide examples of block-level development data obtained by the development data handler 122 and utilized by the heat map generator 126 to generate, e.g., the heat map of FIG. 4.

Thus, a column 402 provides an ordered listing of each object block within the selected, corresponding object. A column 404 demonstrates a number of hits, i.e., a number of times that the corresponding object block of a given row has been changed.

A column 406 lists values for a percentage of alterations or modifications that have been detected for a corresponding object block, relative to the various other object blocks. A column 408 lists a number of single hits, i.e., a number of times that the corresponding object block, and only the corresponding object block, was modified during an access event granted by the access manager 104 of FIG. 1. Correspondingly, a column 410 lists a relative percentage of times that a corresponding object block, and only the corresponding object block, was edited during a given access event granted by the access manager 104.

Column 412 displays a number of lines changed in the corresponding object block. For example, the number of lines listed may refer to a total number of lines changed since the creation of the object or object block in question, or since passing of a specified time, during a certain number of access events granted by the access manager 104, or during some other parameterized timeframe. Similarly, a column 414 lists a number of enhancements that have been made to the corresponding object block within a defined timeframe, where enhancements refer generally, e.g., to changes made that increase a functionality or feature set of the object or object block in question, as compared, for example, to maintenance operations.

In the columns 416, 418, an initial line and lifeline, respectively, of each corresponding object block is displayed. In other words, the identified object lines of the columns 416, 418 define a size and identity of each object block. In the example of FIG. 4, the object lines identified in the columns 416, 418 are divided evenly, i.e., are divided into groups of 200 lines, with each initial line and last line identified therein. Of course, the heat map generator 126 may be configured to define object blocks using a variety of techniques. For example, values for the initial and last lines of identified object blocks may be smaller or larger than the example shown, or may vary in size according to some predetermined algorithm or analysis.

With respect to FIGS. 3 and 4, it may be appreciated that the package analyzer 102 is generally configured to identify, list, and rank objects and/or object blocks thereof, that are being changed relatively frequently and/or extensively, to thereby enable a determination as to whether a relative number of errors or other factors requiring having access that occur in a manner that indicates certain relatively likelihood that more than one correction or other need for editing access will be needed at a given point in time, (e.g., will be needed by the first developer 108 and the second developer 110 at the same time).

Further, the number of lines and percentage of code growth provide good indications as to whether and how a given object may be refactored, and generally provides indications (e.g., through high values being detected for relative numbers of lines and/or percentages of code growth) of potential decreases in code quality. As with other factors such as relative degrees of concentrations of modifications, or relative number of enhancements made to object code, the package analyzer 102 enables a determination of specific portions of objects code that are most likely to cause simultaneous edit access requests, so that the refactoring analyzer 128 may identify such portions for refactoring.

In the examples of FIGS. 3 and 4, it may be observed that some of the screen parameters may be similar, such as parameters characterizing a number of times that access occurred, but measured with respect to the object as a whole (FIG. 3), as compared to an object block-by-object basis (FIG. 4). In other aspects, the measured screen factors may be different, such as the degree of concentration as compared to a number of enhancements. As also described, in many cases, the measured screen parameters may often indicate positive or affirmative indicators of potential refactoring, but, in other examples, the measured screen factors may be inversely or negatively correlated with potential refactoring (e.g., a number of enhancements that is high may provide such negative correlation, since it may be difficult to refactor enhanced code, relative to non-enhanced code).

Figure 5:
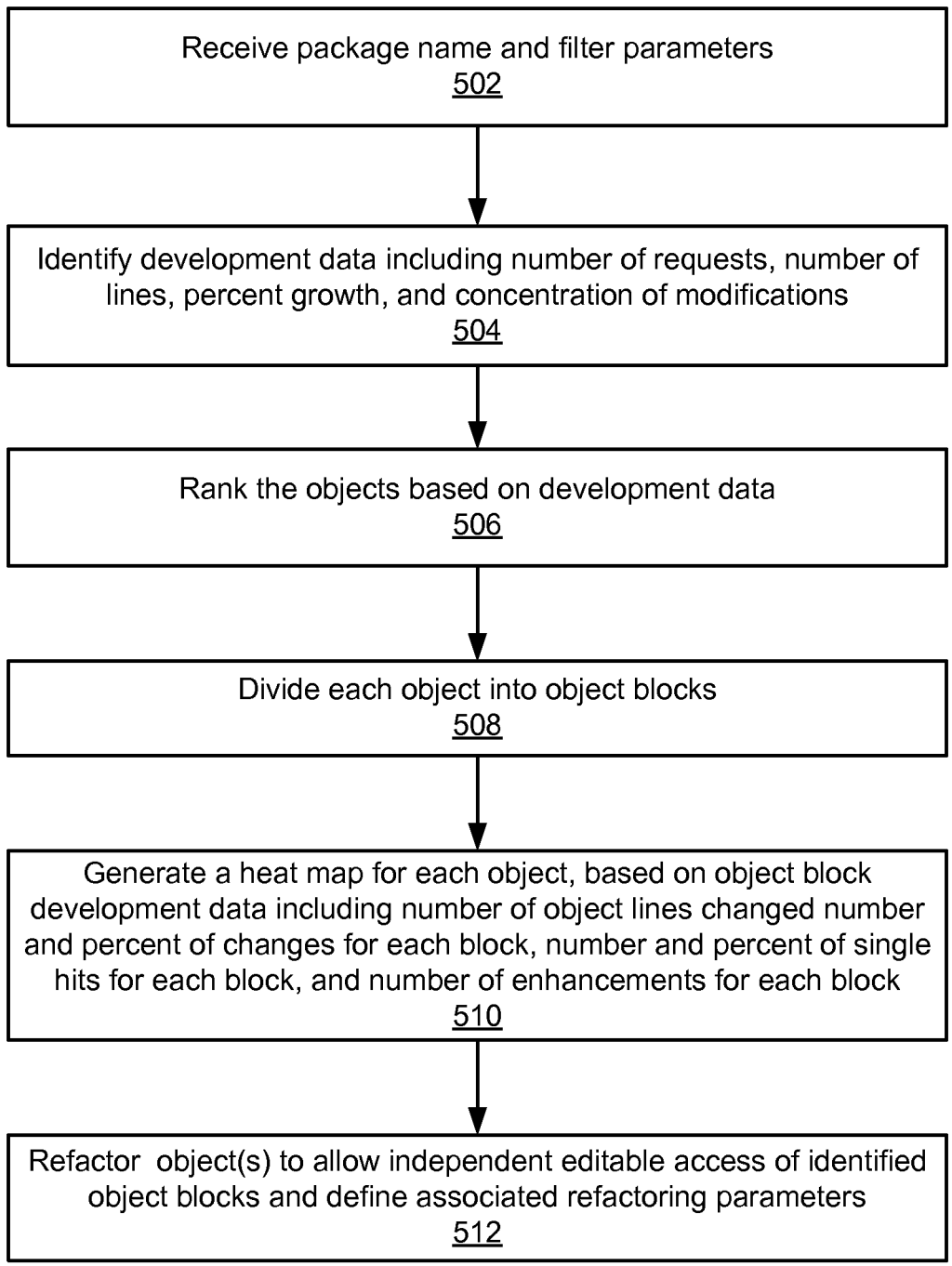
FIG. 5 is a flowchart illustrating more detailed example operations of the system of FIG. 1, in the context of the examples of FIGS. 3 and 4.

FIG. 5 is a flowchart 500 illustrating more detailed example operations of the system 100 of FIG. 1, in the context of the examples of FIGS. 3 and 4. In the example of FIG. 5, a package name and filter parameters may be received (502). For example, the package handler 120 may receive the above-described identification of the package 112, as well as various filter parameters that may be associated with the many potential screen parameters described and referenced above with respect to FIGS. 3 and 4. For example, filter parameters may be set with respect to configurable dates or time windows (e.g., dates or time windows used to measure percentage of code growth). A filter parameter may additionally or alternatively be set for identifying a minimum number of lines to be included in an object of the identified package before including the object within the object rankings of FIG. 3. Similarly, filter parameters may be set regarding a minimum number of objects or minimum number of lines within the package overall.

Further in FIG. 5, development data including a number of access requests, number of lines of code (past and present), percent growth, and concentration of modifications may be identified (504). For example, the development data handler 122, as described, may retrieve these and other types of development data from the various sources of development data represented by the development data repository 117 of FIG. 1.

Based on the development data and filter parameters, the resulting and corresponding objects may be ranked (506). For example, the object ranking generator 124 may provide the ranked objects of FIG. 3. As referenced above with respect to FIG. 3, a manner in which the objects are ranked using the various parameters of FIG. 3 may be configured in any desired manner. For example, the various screen parameters (i.e., values thereof) may be combined using different weights assigned to each type of screen parameter, so that no single value of a given screen parameter necessarily dictates a higher object ranking. In some example implementations, algorithms for ranking the objects may be implemented using various machine-learning algorithms designed to optimize the object rankings over time, using stored refactoring results of previously-executed refactoring operations of the package analyzer 102, or other package analyzers.

Each object may then be divided into object blocks (508), e.g., by the heat map generator 126. As already described, object blocks may be defined with respect to equal numbers of lines of code within each object, as illustrated and described with respect to FIG. 4, or using any other suitable metric. For example, as just described with respect to operations of the object ranking generator 124, suitable machine-learning algorithms may be utilized to optimize division of objects into object blocks, based on previously-executed and stored refactoring results calculated using different types of object block generation.

The heat map generator 126 may then proceed to generate a heat map for each ranked object (510), or a highly ranked subset of objects of the ranked objects. As described, the heat map may be generated based on, e.g., object block development data for each object block, as described with respect to the columns 404-414 of FIG. 4, where, as described, the object block development data may include the number of lines changed, a relative percentage of changes for each object block, a number and percent of single hits for each object block, and a number of enhancements for each object block.

Using the parameters of FIGS. 3 and 4, one or more objects may be refactored by the refactoring analyzer 128 to allow independent editable access of identified object blocks, as well as to define any associated refactoring parameters associated therewith (512). For example, the refactoring analyzer 128 may be configured with various threshold parameters or other parameters for refactoring the analyzed objects and object blocks. For example, in scenarios in which a large number of independent access edits are anticipated to be requested, the refactoring analyzer 128 may be configured with lower thresholds for a size and frequency of grants of independent editable access of identified object blocks. In other words, in such situations, a larger number of object blocks (or larger percentage) of object blocks may be refactored for independent editable access.

With respect to associated refactoring parameters, as referenced above, the refactoring results may be parameterized in a desired manner. For example, refactoring results may be associated with time limits, after which the refactored code reverts to its original form. In cases in which the refactoring analyzer 128 is configured to automatically divide and store identified refactored code portions, then associated refactoring parameters for such operations also may be provided and configured. As with the above-referenced operations of the object ranking generator 124 and the heat map generator 126, machine-learning algorithms may be used to govern current operations of the refactoring analyzer 128, based on analysis and classification of past refactoring operations.

Figure 6:
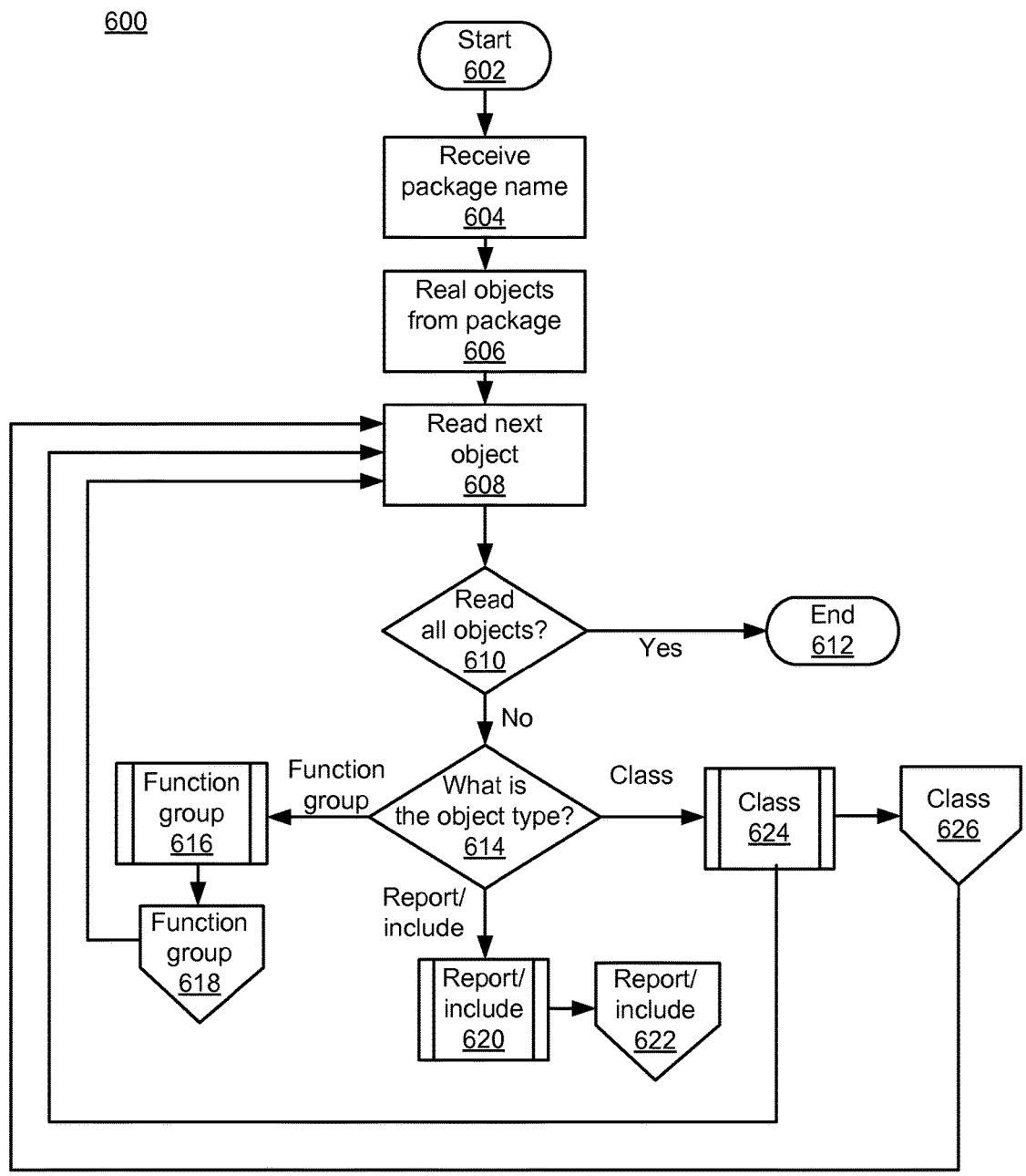
FIG. 6 is a flowchart illustrating more detailed example operations of the flowchart of FIG. 5.

FIG. 6 is a flowchart 600 illustrating more detailed example operations of the flowchart 500 of FIG. 5. In particular, as referenced above, FIGS. 6-13 are illustrations of example implementations of the system 100 of FIG. 1, in context specific to the ABAP programming language of SAP SE of Waldorf, Germany.

In the example of FIG. 6, after a start operation (602), a package name is received (604) and objects are read from the package (606). As the first/last object is read from the package (608), it is determined whether the read object is a final object to be read from the package (610), in which case the process would end (612). If the object is not a final object to be read from the package (610), then the object type may be determined (614).

In the example of FIG. 6, object types may include a function group (616), in which case a function group operation for reading the function group object may be executed (618), as described in more detail below with respect to FIG. 7. Another object type might include a report/include object type (620), leading to a report/include object type operation, described in detail below with respect to FIG. 8. Finally in the example of FIG. 6, a third object type includes a class (624), leading to a class operation for reading objects of this type (626), as described in detail below with respect to FIG. 9. As already referenced, operations of the flowchart 600 of FIG. 6 continue until all objects have been read from the package (610), and the process ends (612).

Generally speaking, of course, detailed descriptions of the various object types in the ABAP programming language are beyond the scope of the present description, and, moreover, such details would be apparent to one of skill in the art. Nonetheless, for purposes of general understanding of the operations of FIGS. 6 and 7, it may be appreciated that a function group represents a container for one or more function modules, where function modules refer to procedures defined for the purpose of encapsulating and reusing global functions. Also in the context of a function group, a report statement governing a manner in which code output is provided or formatted, and/or an include program used in context of modularizing source code may be included within the function group.

Figure 7:
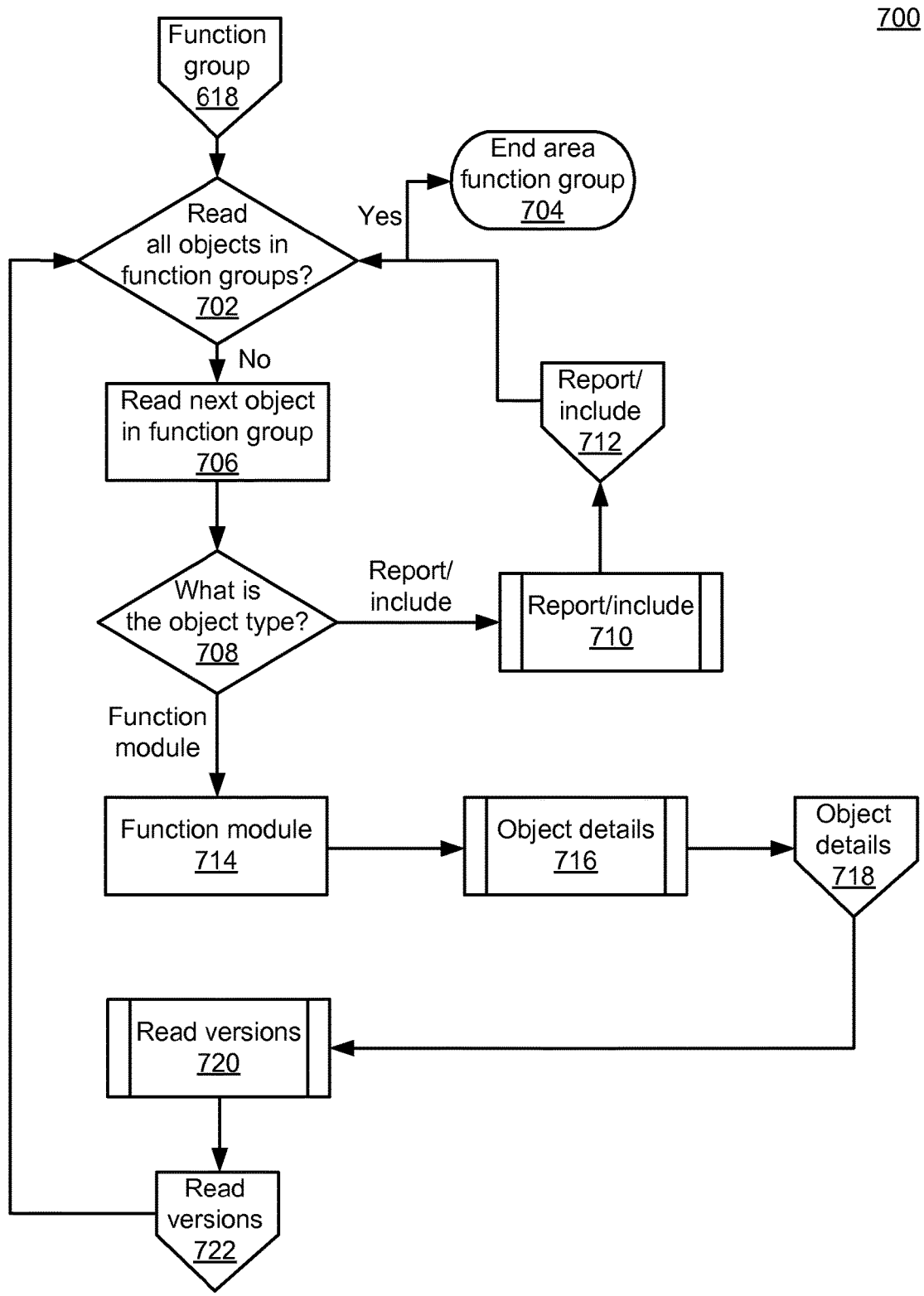
FIG. 7 is a flowchart illustrating analysis of a function group in accordance with the example of FIG. 6.

Thus, in FIG. 7, if all objects and a function group being read have been read (702), then the analysis of the function group ends (704). Otherwise, the next object in the function group is read (706).

If the object type of the object read from the function group is a report/include object type (710), then operations for reading objects of these types may be executed (712), as referenced in more detail below with respect to FIGS. 8 and 10. Otherwise, if the object type is a function module (708), then the function module is analyzed (714), and object details (716) are obtained (718). In this way, various versions of the object of the function module may be examined (720), using appropriate version reading operations (722), as described in more detail, below, with respect to FIG. 11. As may be observed, operations of the flowchart 700 of FIG. 7 continue until all objects in the function group have been read (702), and the operations ends (704).

Figure 8:
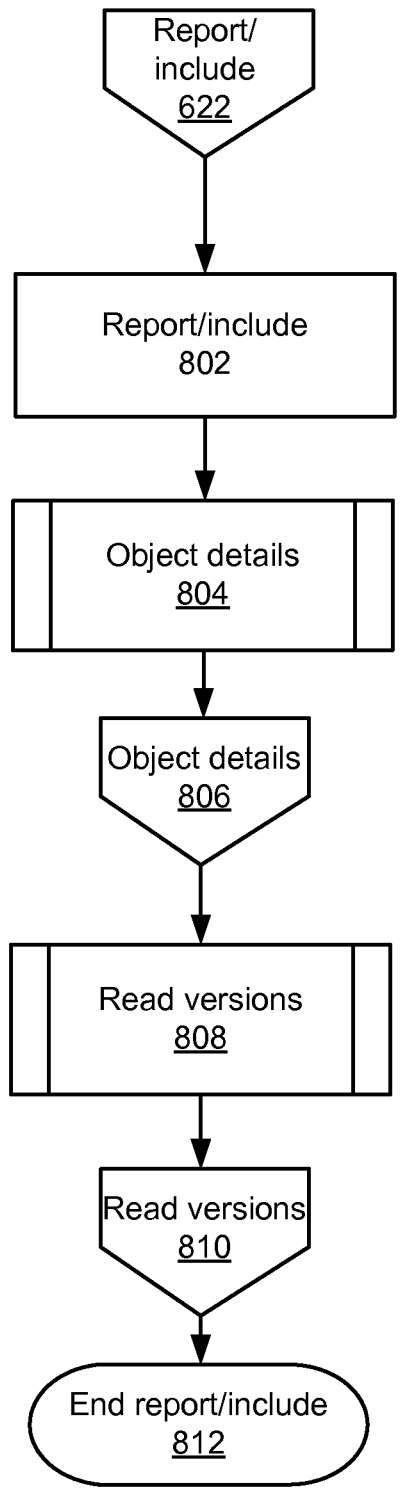
FIG. 8 is a flowchart illustrating analysis of a report/include object type in accordance with the example of FIG. 6.

FIG. 8 illustrates a flowchart 800 providing example operations associated with analysis of report/include object type objects, as referenced with respect to FIG. 6 (622), as well as with respect to FIG. 7 (710, 712). In FIG. 8, for a report/include type of object (802), object details are read (804), and analyzed (806). Versions of the object being analyzed are read (808, 810), to thereby conclude the illustrated operations (812).

Figure 9:
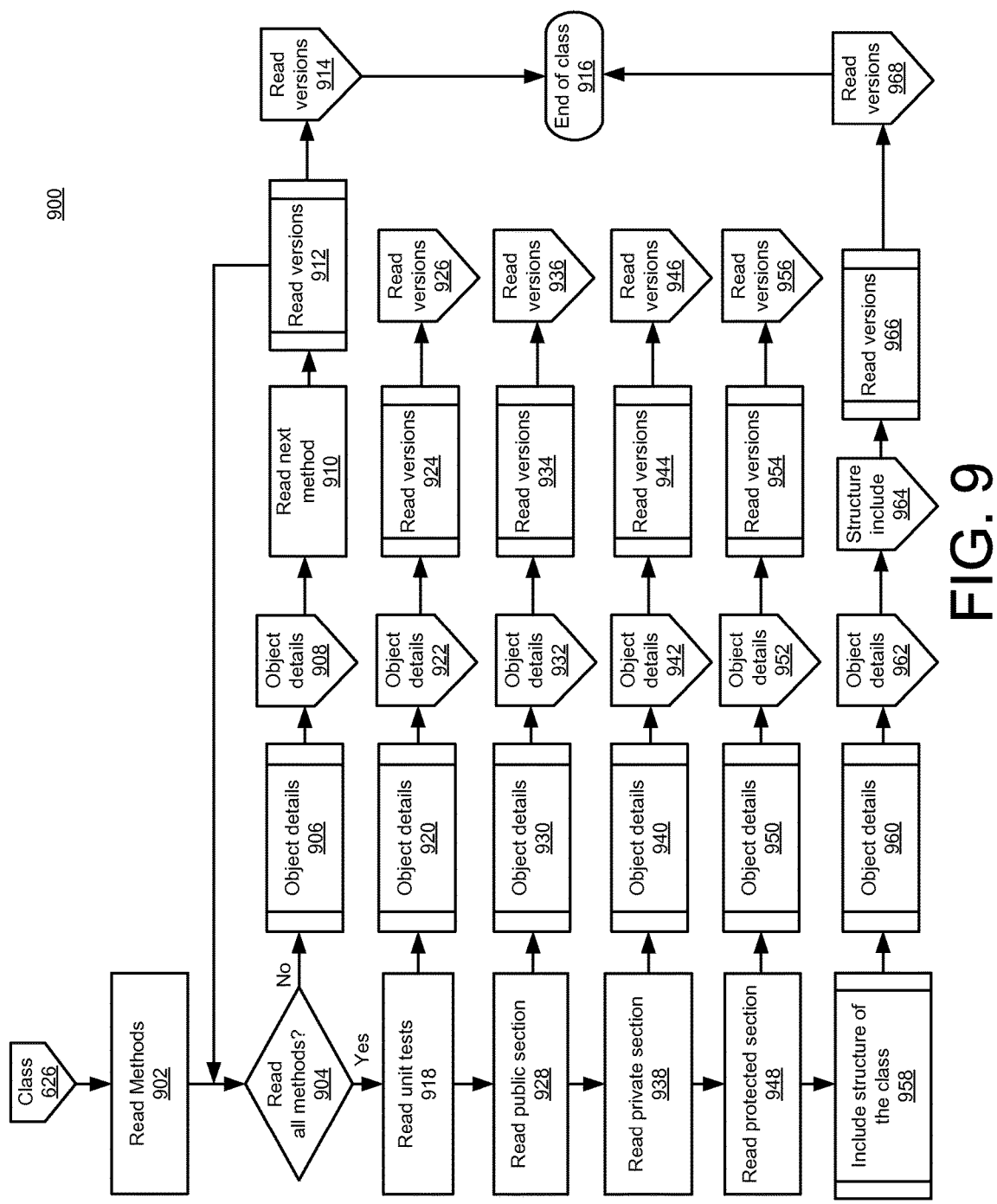
FIG. 9 is a flowchart illustrating analysis of a class object type in accordance with the example of FIG. 6.

FIG. 9 is a flowchart 900 illustrating example operations for analyzing objects of the object type class in FIG. 6 (626). As shown in FIG. 9, methods of the object of object type class are read therefrom (902). If all methods of the class object have not been read (904), then object details (906) are analyzed (908), a next method is read (910), and versions of the object methods are read (912) and analyzed (914), thereby leading to an end of an analysis of the class in question (916).

If all methods of the object of type class have been read (904), then unit tests may be read (918), leading to obtaining object details (920) and subsequent analysis operations (922), to thereby obtain the versions read (924) and associated analysis operations (926).

Then, a public section of the object may be read (928), leading to the sequence of obtaining and analyzing data regarding the object details and read versions (930, 932, 934, 936) as already described above with respect to data and associated operations 920-926. Further, similarly, a private section of the object may be read (938), again leading to a corresponding gathering of associated object details and read versions (940, 942, 944, 946). Again, a protected may be read (948), leading to the same types of gathering and analysis of object details and object versions (950, 952, 954, 956).

Finally in FIG. 9, an include structure of the class being analyzed (958) may analyze to obtain object details (960), resulting in corresponding operations for analyzing the object details (962). The include structure may be analyzed (964), as described below with respect to FIG. 10, the various versions thereof may be read (966), and analyzed (968), again leading to an end of the analysis of the object type class (916).

Figure 10:
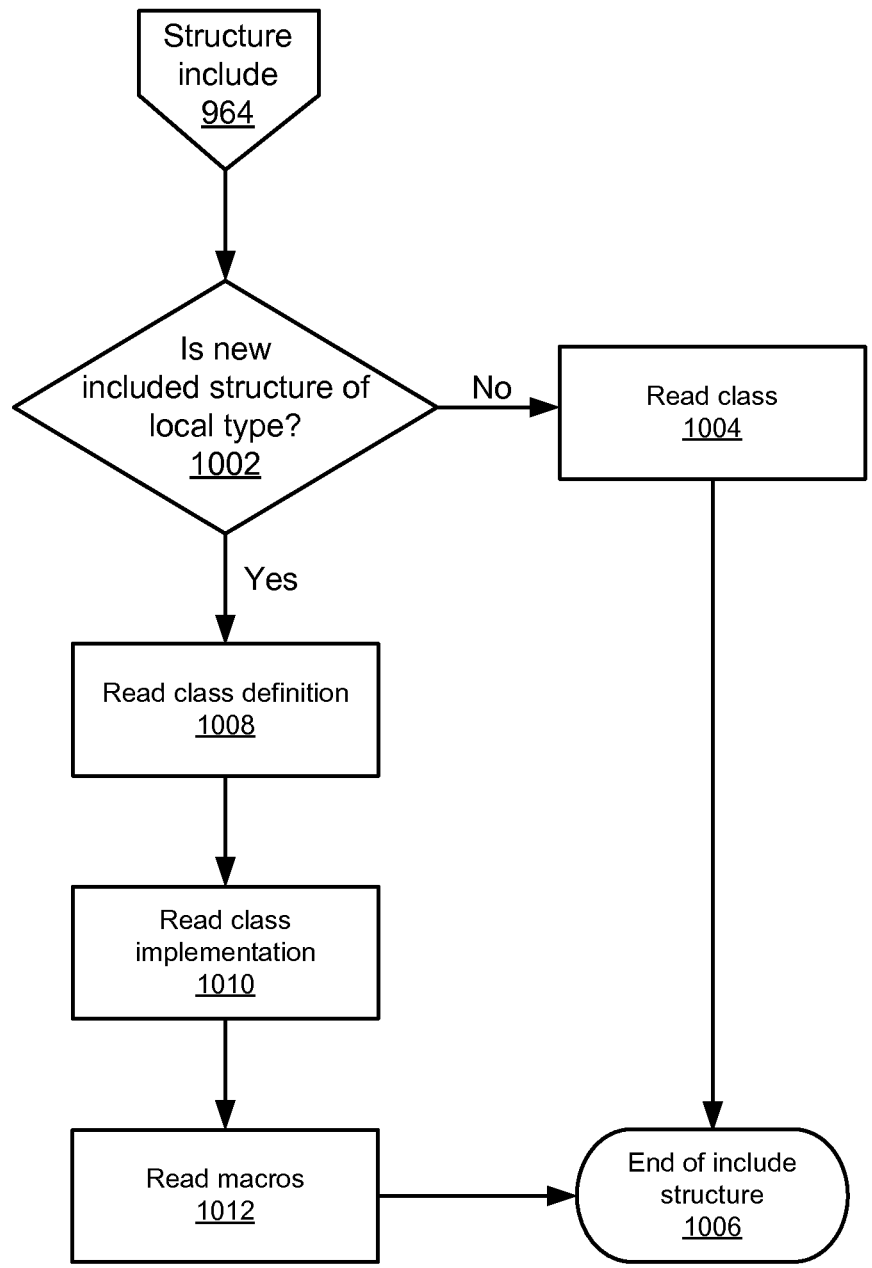
FIG. 10 is a flowchart illustrating analysis of a structure/include object type in accordance with the example of FIG. 6.

As just referenced, FIG. 10 is a flowchart 1000 illustrating more detailed example operations with respect to the structure include analysis (964) of FIG. 9. In the example of FIG. 10, if the new include structure is not of local type (1002), then the associated class may be read (1004), and the analysis of the include structure may end (1006).

Otherwise, the class definition may be read (1008). The class implementation also may be read (1010). Finally, any include macros may be read (1012), thereby again leading to an end of the analysis of the include structure (1006).

Figure 11:
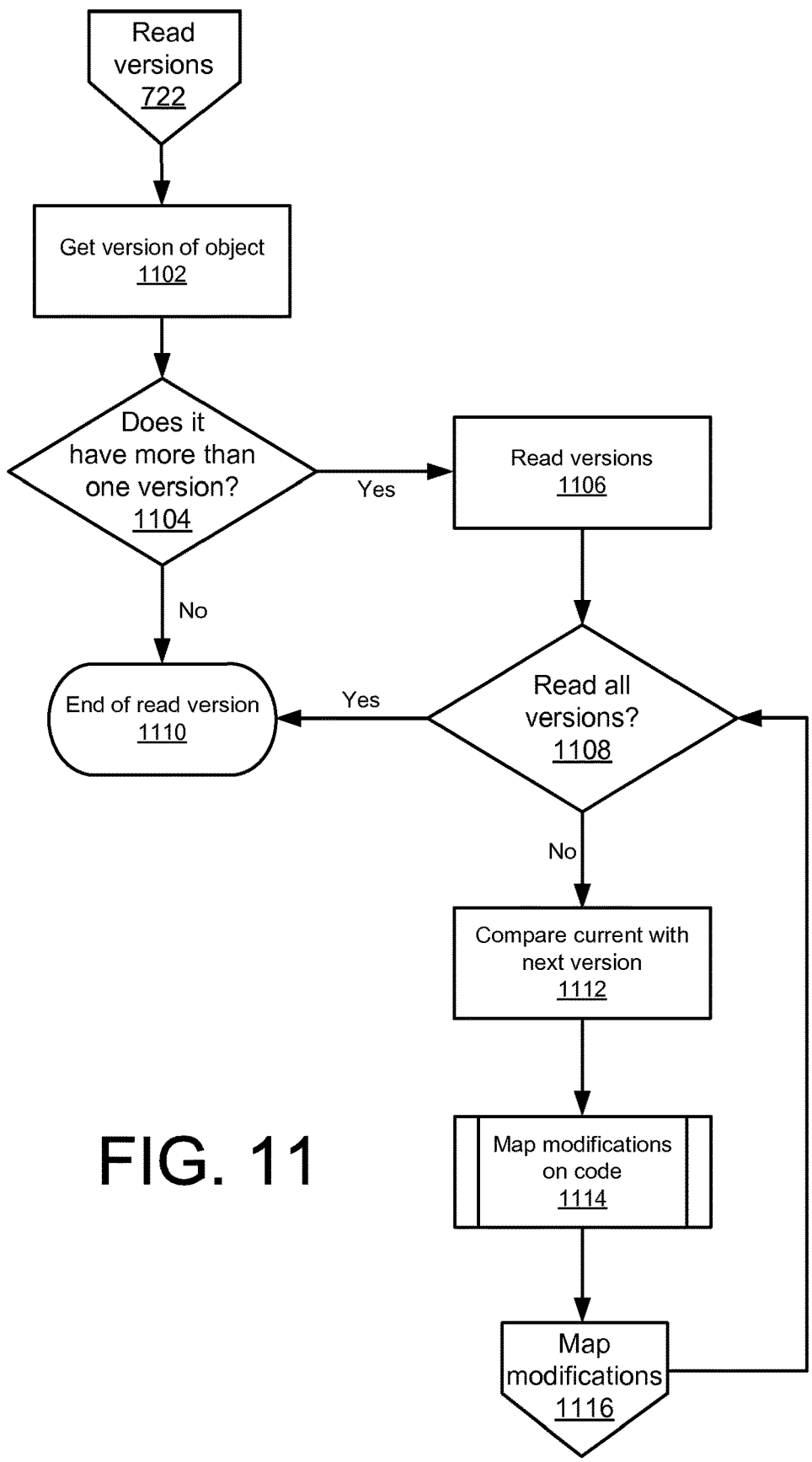
FIG. 11 is a flowchart illustrating analysis of different versions of objects in accordance with the example of FIGS. 6 and 7.

As referenced above, FIG. 11 is a flowchart 1100 illustrating more detailed example operations of the version reading operations as referenced above with respect to FIG. 7 (722), but also referenced with respect to FIG. 8 (810), and FIGS. 9 (914, 926, 936, 946, 956, and 968). In the example of FIG. 11, versions of the object being analyzed and the various example read version operations referenced above are obtained (1102). If the object being analyzed has more than one version (1104), then the versions are read (1106). If there's not more than one version (1104), then the end of the version read is reached (1110). Similarly, if all versions have been read (1108), the operational end is reached (1110).

If all versions have not yet been read (1108), a current version may be compared with a subsequent (1112). In this way, code modifications may be mapped (1114), using map modifications (1116), as described in more detail below with respect to FIG. 12.

Figure 12:
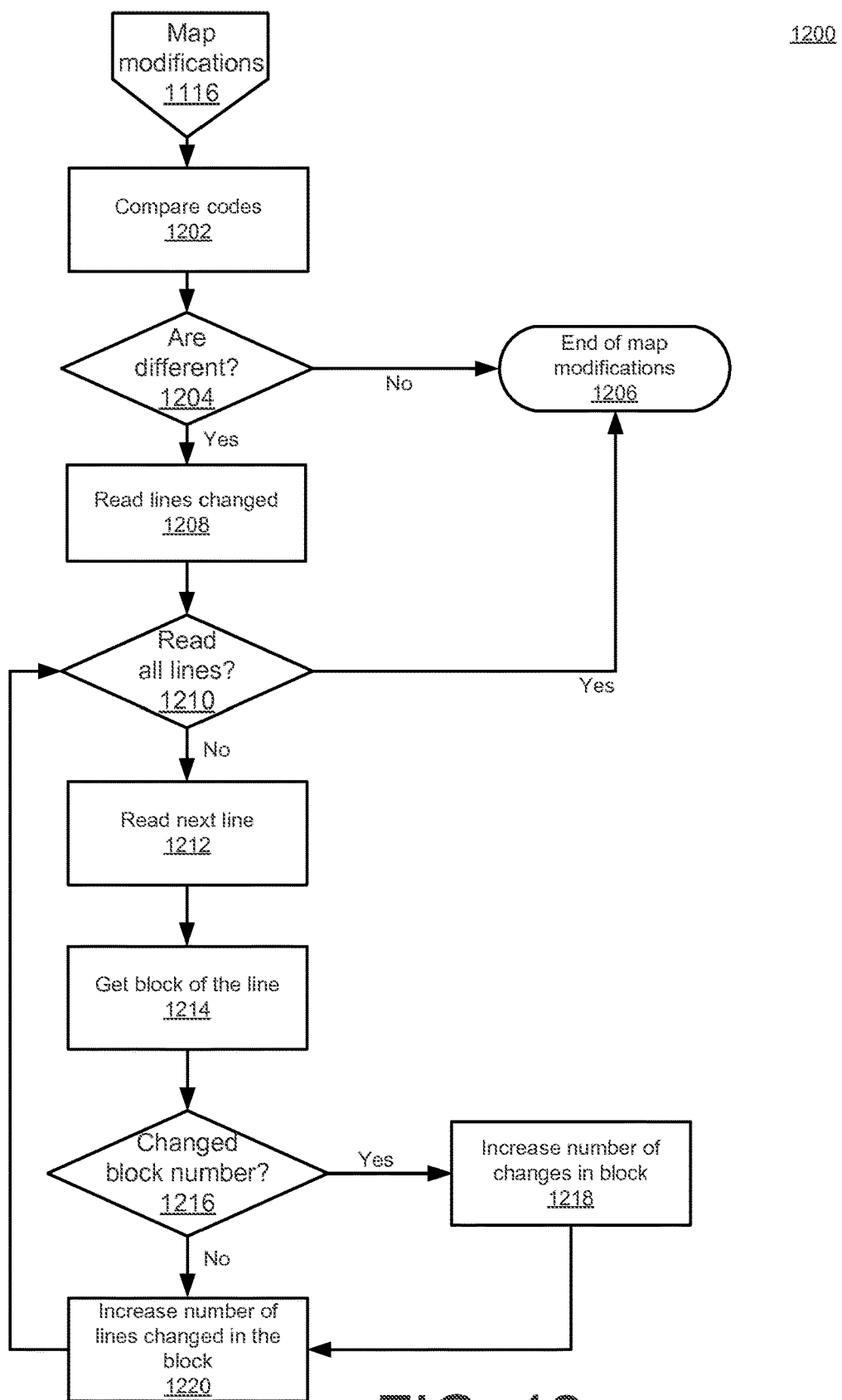
FIG. 12 is a flowchart illustrating mapping of object modifications in accordance with the example of FIG. 6.

Specifically, as shown in FIG. 12, a code comparison may be conducted (1202), and if the codes are not different (1204), the mapping modifications may be ended (1206). Otherwise, as the codes are different (1204), then the changed lines of the code may be read (1208). If all lines have been read (1210), then the process ends (1206). Otherwise (1210), the next line may be read (1212), to thereby obtain an object block of the line in question (1214).

If the block number for the object block is changed (1216), then the number of changes in the object block may be increased (1218). Afterwards, or if the object block number is not changed (1216), then a number of lines changed within the object block may be increased or incremented (1220). As illustrated, these operations continue until all lines have been read (1210), and the process ends (1206).

Figure 13:
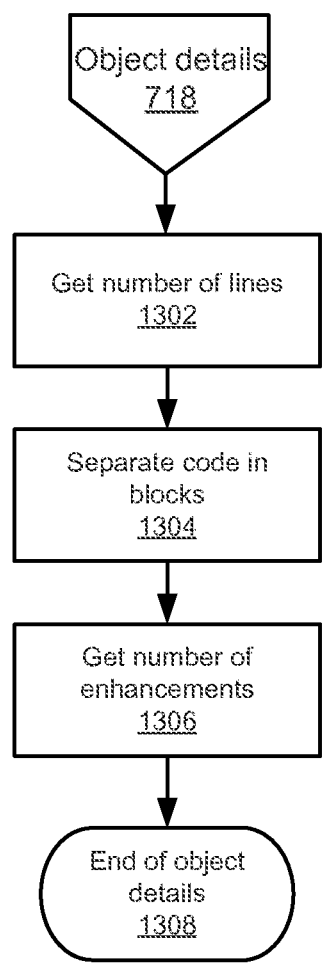
FIG. 13 is a flowchart illustrating analysis of object details in accordance with the example of FIG. 6.

FIG. 13 is a flowchart 1300 illustrating more detailed example operations of the object details analysis first referenced with respect to FIG. 7 (718), and also referenced thereafter (806 in FIG. 8, and 908, 922, 932, 942, 952, and 962 in FIG. 9). As shown in FIG. 13, the analysis includes obtaining the number of lines in the object (1302) and separating the code into object blocks (1304). The number of enhancements to the code is obtained (1306), thereby leading to an end (1308) of the analysis for the object details.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for executing instructions stored on a non-transitory computer readable storage medium, the method comprising:
   receiving an identification of a software package stored in a code library and accessible for editing by at least a first developer and a second developer, wherein the software package includes a plurality of objects, and wherein a first grant of editing access to the first developer for an object prohibits, while the first grant is valid, a second grant of editing access to the second developer for the object;
   accessing object-level development data for the plurality of objects, including the object, the object-level development data characterizing historical development efforts of one or more developers involved in developing the plurality of objects, including the object, wherein the object-level development data characterizes a development history and current status of each object of the plurality of objects;
   rank the plurality of objects based on the object-level development data, the ranking characterizing a relative potential benefit obtained from granting independent editable access to at least two object blocks of each object, including the object;
   selecting the object, based at least on the object-level development data and on the ranking;
   identifying, from the object, at least two object blocks comprising a first object block and a second object block for independent grants of editing access to the first developer and the second developer, the first object block characterized by first block development data and the second object block characterized by second block development data, wherein the identification includes a comparison of the first block development data and the second block development data and a determination that the first object block has been associated with historically greater development effort than the second object block;
   performing a first refactoring of the object into the first object block and the second object block for the independent grants of editing access;
   monitoring, during a time following the first refactoring, the object-level development data to obtain updated object-level development data;
   performing, based on the updated object development data, a second refactoring of the first object block and the second object block to obtain an updated first object block and an updated second object block with independent grants of editing access; and
   making available, based on the second refactoring and in response to user selection user selection, the updated first object block and the updated second object block for the independent grants of editing access.

2. The method of claim 1, wherein the identifying includes generating a heat map for the object of the plurality of objects, in which the object is divided into object blocks including at least the first object block and the second object block based on a number of lines of code in the object, and the heat map is generated based on the object-level development data for the object blocks, including the first block development data and the second block development data.

3. The method of claim 1, further comprising:
   displaying the first object block and the second object block for the independent grants of editing access; and
   receiving a selection of the first object block and the second object block for the independent grants of editing access.

4. The method of claim 1, wherein the object-level development data characterizes lines of codes included in each object, a degree of change of a number of the lines of code over time, and an access history characterizing a number of versions of each object.

5. The method of claim 1, wherein the object-level development data characterizes an extent of concentration of edits within each object of the plurality of objects.

6. A computer program product, the computer program product being tangibly embodied on a non-transitory computer-readable storage medium and comprising instructions that, when executed, are configured to cause at least one computing device to:

receive an identification of a software package stored in a code library and accessible for editing by at least a first developer and a second developer, wherein the software package includes a plurality of objects, and wherein a first grant of editing access to the first developer for an object prohibits, while the first grant is valid, a second grant of editing access to the second developer for the object;

access object-level development data for the plurality of objects, including the object, the object-level development data characterizing historical development efforts of one or more developers involved in developing the plurality of objects, including the object, wherein the object-level development data characterizes a development history and current status of each object of the plurality of objects;

rank the plurality of objects based on the object-level development data, the ranking characterizing a relative potential benefit obtained from granting independent editable access to at least two object blocks of each object, including the object;

select the object, based at least on the object-level development data and on the ranking;

identify, from the object, at least two object blocks comprising a first object block and a second object block for independent grants of editing access to the first developer and the second developer, the first object block characterized by first block development data and the second object block characterized by second block development data, wherein the identification includes a comparison of the first block development data and the second block development data and a determination that the first object block has been associated with historically greater development effort than the second object block;

perform a first refactoring of the object into the first object block and the second object block for the independent grants of editing access;

monitor, during a time following the first refactoring, the object-level development data to obtain updated object-level development data;

perform, based on the updated object-level development data, a second refactoring of the first object block and the second object block to obtain an updated first object block and an updated second object block with independent grants of editing access; and make available, based on the second refactoring and in response to user selection, the updated first object block and the updated second object block for the independent grants of editing access.

7. The computer program product of claim 6, wherein the object-level development data characterizes lines of codes included in each object, a degree of change of a number of the lines of code over time, and an access history characterizing a number of versions of each object.

8. The computer program product of claim 6, wherein the object-level development data characterizes an extent of concentration of edits within each object of the plurality of objects.

9. The computer program product of claim 6, wherein the instructions, when executed by the at least one computing device, are further configured to generate a heat map for the object of the plurality of objects, in which the object is divided into object blocks including at least the first object block and the second object block based on a number of lines of code in the object, and the heat map is generated based on object-level development data for the object blocks, including the first block development data and the second block development data.

10. The computer program product of claim 6, wherein the object-level development data includes a number of changes per object block within a defined timeframe, calculated relative to remaining object blocks of the object.

11. The computer program product of claim 6, wherein the object-level development data includes a number of times each object block was the only block accessed during an access event, calculated relative to remaining object blocks of the object.

12. A system comprising:
at least one data processor; and
memory storing instructions which, when executed by the at least one data processor, result in operations comprising:

receiving an identification of a software package stored in a code library and accessible for editing by at least a first developer and a second developer, wherein the software package includes a plurality of objects and wherein a first grant of editing access to the first developer for an object prohibits, while the first grant is valid, a second grant of editing access to the second developer for the object;

accessing object-level development data for the plurality of objects, including the object, the object-level development data characterizing historical development efforts of one or more developers involved in developing the plurality of objects, including the object, wherein the object-level development data characterizes a development history and current status of each object of the plurality of objects;

ranking the plurality of objects, including the object, based on the object-level development data, the ranking characterizing a relative potential benefit obtained from granting independent editable access to at least two object blocks of each object, including the object;

selecting the object, based at least on the object-level development data and on the ranking;

identifying, from the object, at least two object blocks comprising a first object block and a second object block for independent grants of editing access to the first developer and the second developer, the first object block characterized by first block development data and the second object block characterized by second block development data, wherein the identification includes a comparison of the first block development data and the second block development data and a determination that the first object block has been associated with historically greater development effort than the second object block;

performing a first refactoring of the object into the first object block and the second object block for the independent grants of editing access;

monitoring, during a time following the first refactoring, the object-level development data to obtain updated object-level development data;

performing, based on the updated object development data, a second refactoring of the first object block and the second object block to obtain an updated first object block and an updated second object block with independent grants of editing access; and making available, based on the second refactoring and in response to user selection, the updated first object block and the updated second object block for the independent grants of editing access.

13. The system of claim 12, wherein the object level development data includes a characterization of a relative concentration level of edits within each object of the plurality of objects.

14. The system of claim 12, wherein the instructions, when executed by the at least one data processor, result in operations further comprising:

refactoring the at least one object block based on refactoring parameters characterizing a length of time during which the refactoring is valid.

15. The system of claim 12, wherein the instructions, when executed by the at least one data processor, results in operations further comprising:

generating a heat map for the object of the plurality of objects, in which the object is divided into object blocks including at least the first object block and the second object block based on a number of lines of code in the object, and wherein the heat map is generated based on the object-level development data for the plurality of objects, including the first block development data and the second block development data.

16. The system of claim 15, wherein the instructions, when executed by the at least one data processor, results in operations further comprising:

displaying the ranking of each object of the plurality of objects, each object being displayed with a link to its associated heat map.

17. The system of claim 15, wherein the instructions, when executed by the at least one data processor, results in operations further comprising:

displaying the heat map of the object including the plurality of object blocks identified with respect to lines of code of the object.

18. The system of claim 15, wherein the heat map characterizes a relative benefit of selecting each object block as the at least one object block of the plurality of object blocks to be refactored.

19. The system of claim 12, wherein the object-level development data includes a number of changes per object block within a defined timeframe, calculated relative to remaining object blocks of the object.

20. The system of claim 12, wherein the object-level development data includes a number of times each object block was the only block accessed during an access event, calculated relative to remaining object blocks of the object.

* * * * *